March 30, 1948.  G. MAXON, JR  2,438,571
STABILIZER FOR SPRING MOUNTED VEHICLES
Filed May 27, 1944  5 Sheets-Sheet 1
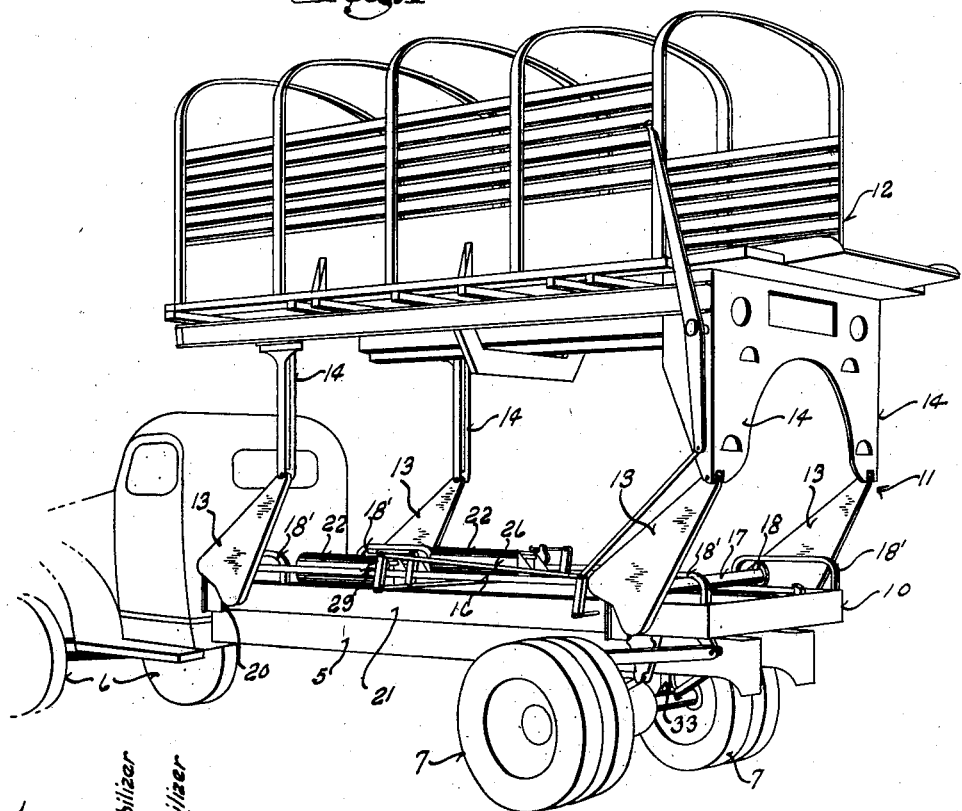
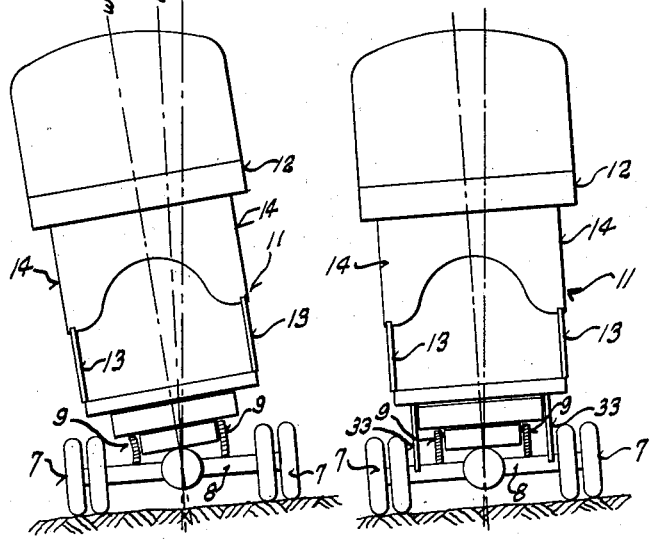
Inventor
Glenway Maxon Jr.

March 30, 1948. G. MAXON, JR 2,438,571
STABILIZER FOR SPRING MOUNTED VEHICLES
Filed May 27, 1944 5 Sheets-Sheet 2
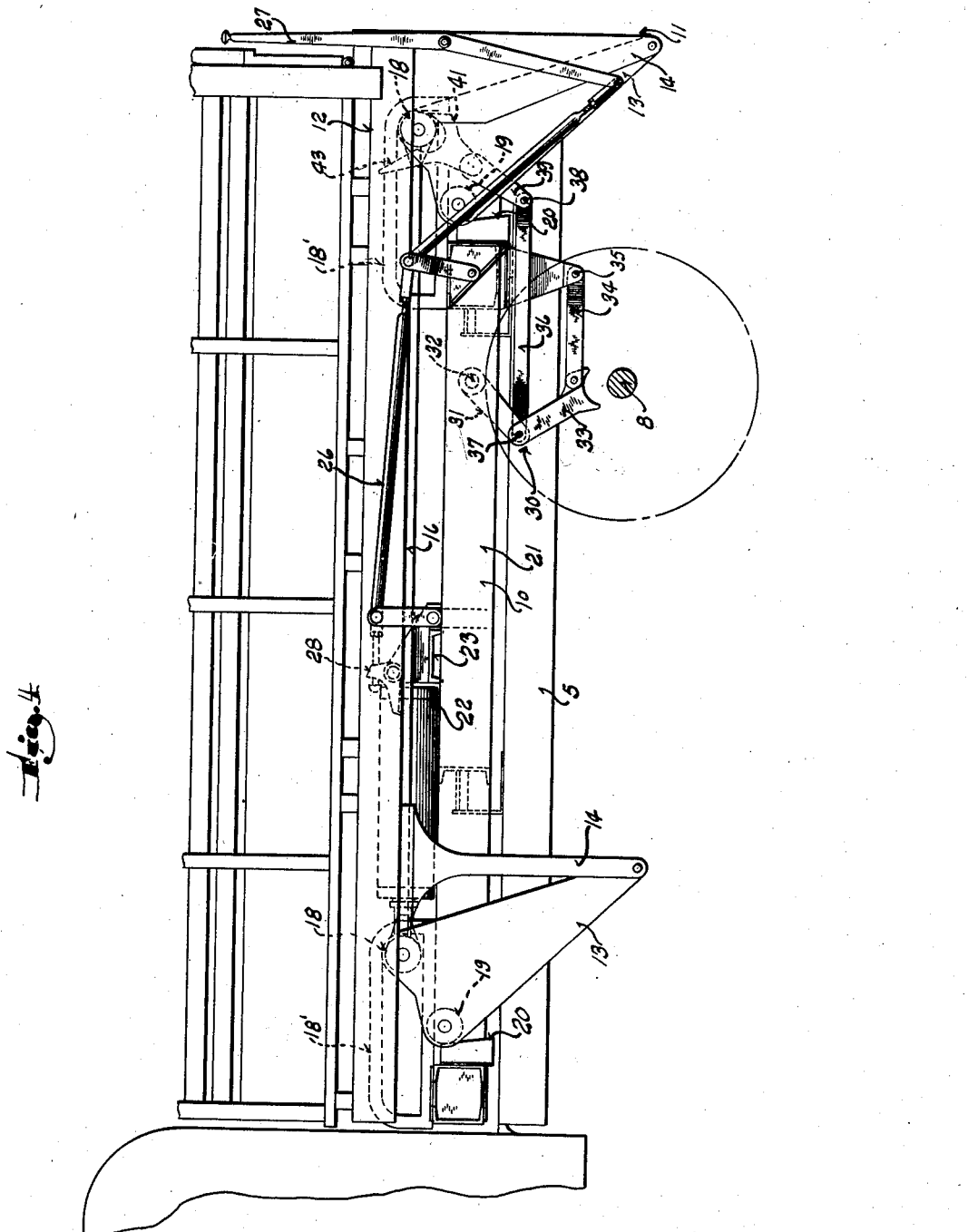
Inventor
Glenway Maxon Jr.

March 30, 1948.   G. MAXON, JR   2,438,571
STABILIZER FOR SPRING MOUNTED VEHICLES
Filed May 27, 1944   5 Sheets-Sheet 3

Inventor
Glenway Maxon Jr.

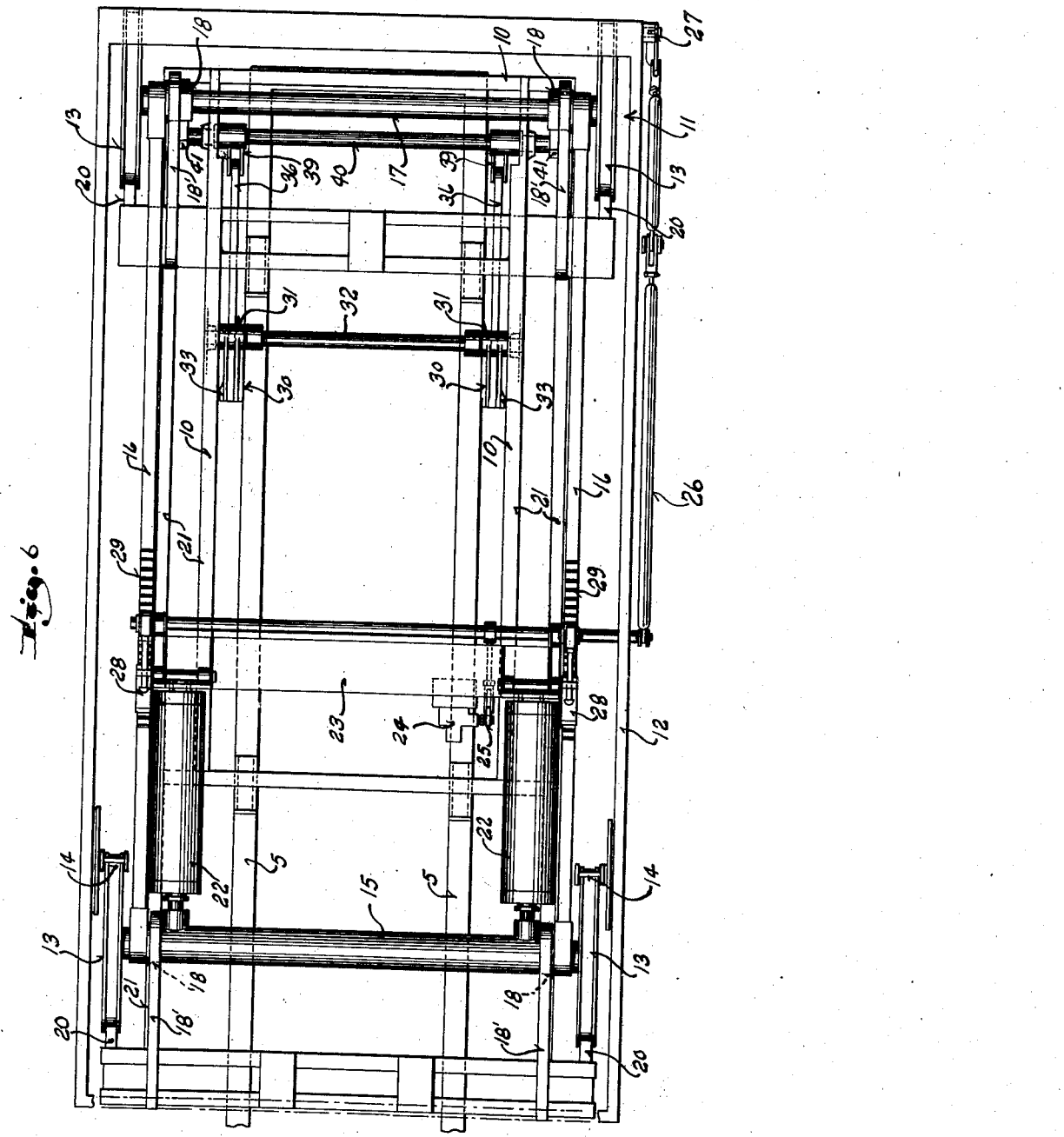

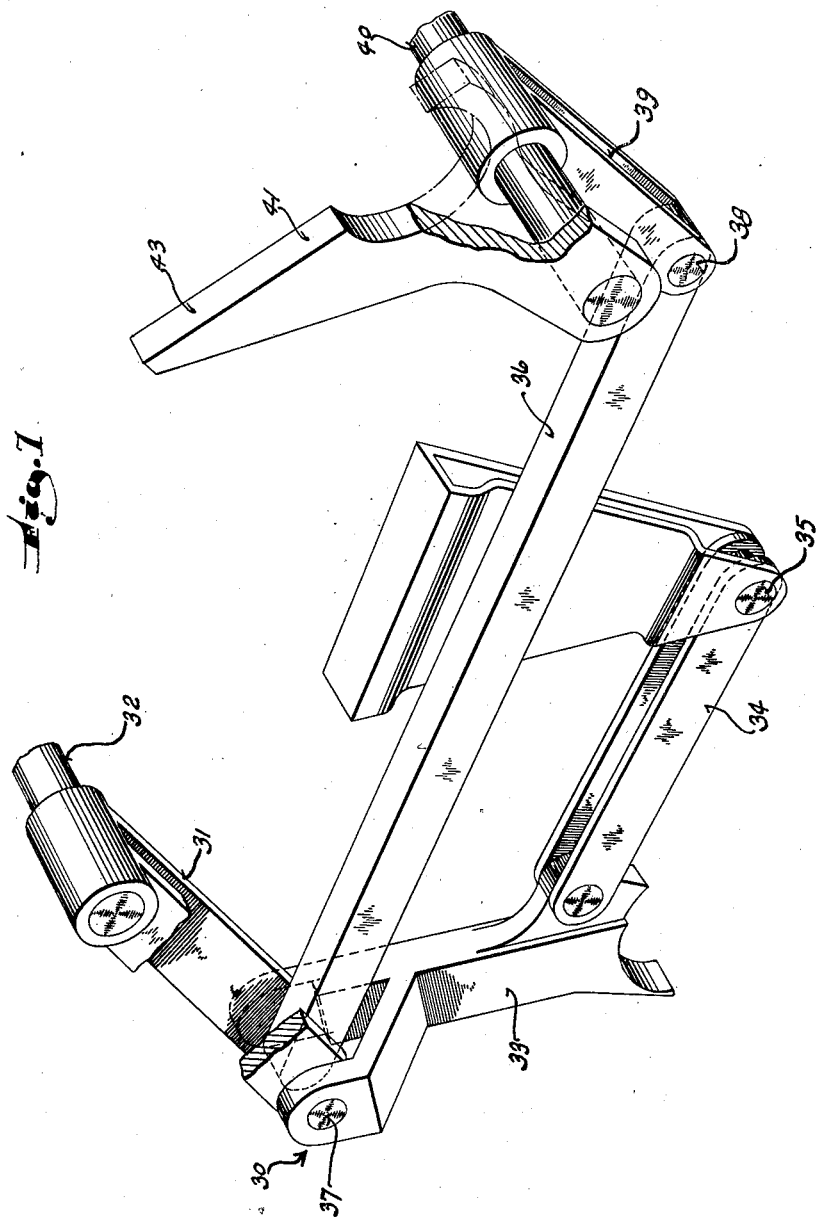

UNITED STATES PATENT OFFICE 2,438,571

STABILIZER FOR SPRING MOUNTED VEHICLES

Glenway Maxon, Jr., Milwaukee, Wis.

Application May 27, 1944, Serial No. 537,753

1 Claim. (Cl. 280—6)

This invention relates to trucks and similar vehicles equipped with elevatable bodies.

In vehicles of this type there has always been a serious danger of tipping, especially where the hoist mechanism is capable of elevating the load carrying body to a substantial height. For instance, if a truck or other vehicle equipped with an elevatable body happens to be parked on a slight lateral inclination, the lateral displacement of the center of gravity, which increases as the load is elevated, results in uneven loading of the springs by which the vehicle chassis is supported on its running gear. The greater share of the load is carried by the springs on the downgrade side of the inclination and as a result the displacement of the center of gravity is aggravated.

An illustration of this situation is found in the delivery of coal by trucks equipped with elevatable bodies. When such a truck is brought to rest near a curb, its axles are at an angle to the horizontal, so that when the body is raised the center of gravity moves toward the curb.

The support of the body passes mostly through the rear springs. These springs are comparatively close together and inasmuch as the lateral displacement of the center of gravity throws the greater share of the load on the springs nearest the curb, a condition at which the center of gravity is substantially directly over the springs nearest the curb is a definite possibility. When this occurs the truck is exceedingly unstable and liable to tip.

To guard against this possibility most drivers of high lift trucks, which deliver coal, carry with them a small wooden ramp wide enough for dual tires and just long enough to enable the rear tires to be easily driven on. The ramp is seldom more than three and one-half inches (3½") high, but this is usually sufficient to level off the load.

Another situation where stability is especially needed is in the loading of cargo carrying airplanes by means of high lift trucks and similar units. Here one of the requisites is that the load carrying body on the truck must be capable of being used as a sorting or arranging platform to permit the various items of the load to be moved around as required to effect proper loading of the plane.

Such handling of the cargo in order to be efficient must not be hampered by considerations of the distribution of weight on the truck, as it is very likely in situations such as this that one side of the truck body or platform may be heavily loaded while the other is not loaded at all. With the equipment heretofore available such a condition would result in dangerous listing of the truck because of the unequal loading of the rear springs.

It is, therefore, an object of the present invention to provide stabilizing means for use in high lift trucks and similar vehicles by which the load is taken entirely off the rear springs and imposed directly on the rear axle at widely spaced points.

Another object of this invention is to provide a stabilizer to in effect shunt out the rear springs of a truck or similar vehicle automatically during initial elevation of the truck body or platform and remain active until the body is again restored to its lowered position of transit.

In this connection it is a further object of this invention to provide a stabilizing mechanism for supporting the load directly on the rear axle independently of the spring which is normally in an inactive position and operable to its active position by the mechanism provided to raise and lower the vehicle body.

Still another object of this invention is to provide a stabilizer for the purpose set forth which is in the nature of a toggle with one arm thereof pivoted to the chassis of the vehicle or a part fixed thereon, and the other arm designed to engage and substantially embrace the rear axle upon straightening of the toggle and whereby the load is carried by the straightened toggle.

In trucks designed for the handling of frieght and cargo, it is desirable to have the elevation of the truck under the control of an attendant on the truck platform or body as it is being raised. It is, therefore, another object of this invention to provide a simple, effective control mechanism by which an attendant standing on the truck platform may control the mechanism.

With the above and other objects in view, which will appear as the description proceeds, this invention resides in the novel construction, combination and arrangement of parts substantially as hereinafter described, and more particularly defined by the appended claim, it being understood that such changes in the precise embodiment of the herein disclosed invention may be made as come within the scope of the claim.

The accompanying drawings illustrate one complete example of the physical embodiment of the invention constructed in accordance with the best modes so far devised for the practical application of the principles thereof, and in which:

Figure 1 is a perspective view of a truck designed particularly for the handling of air cargo and freight and embodying this invention;

Figures 2 and 3 are diagrammatic views illustrating by comparison the manner in which the instability of the conventional truck is eliminated by this invention;

Figure 4 is a view in side elevation of the truck shown in Figure 1, but with the body lowered;

Figure 6 is a top plan view of the subframe and chassis of the truck; and

Figure 7 is a perspective view of the stabilizing mechanism per se.

Figure 5:
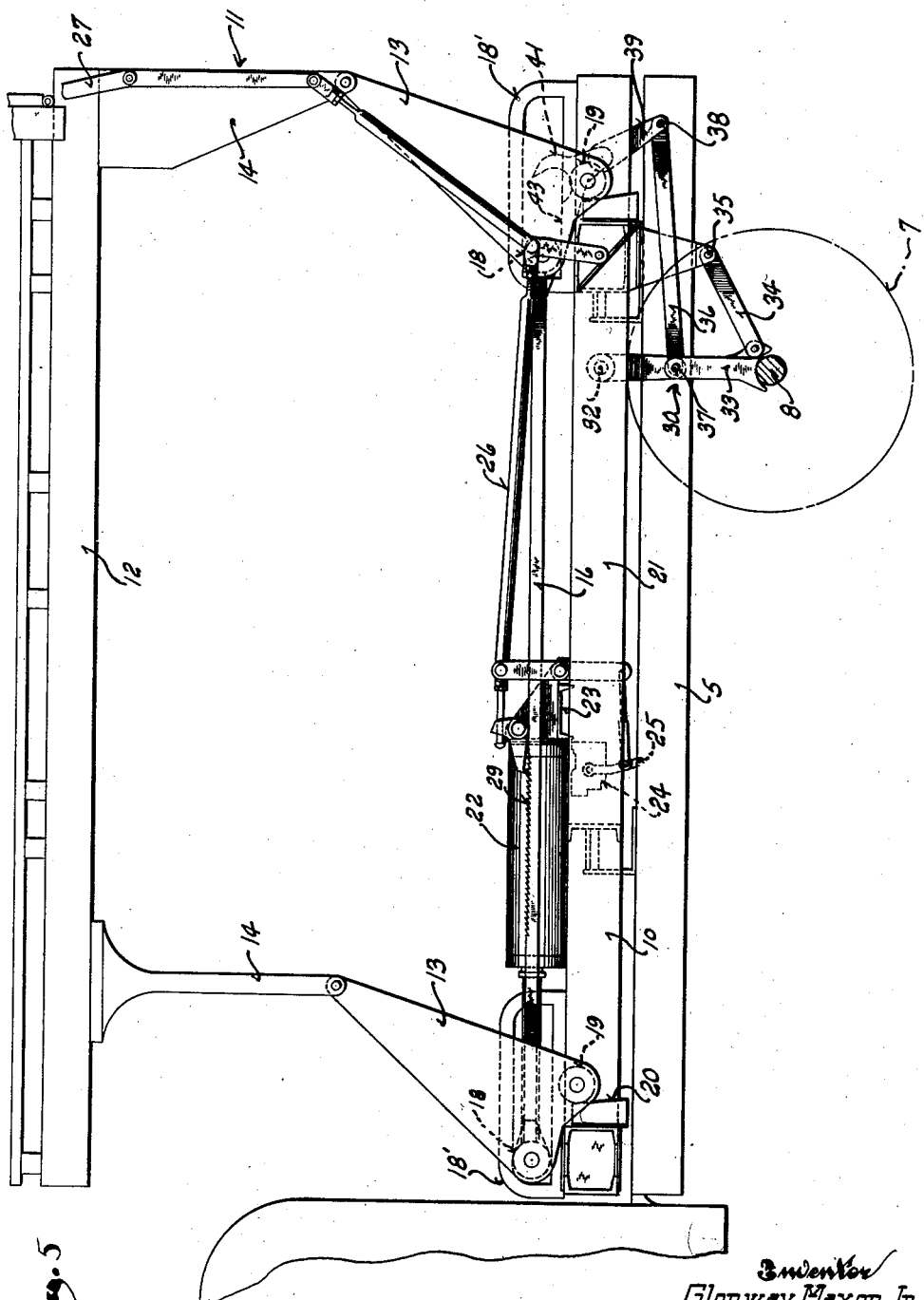
Figure 5 is a view similar to Figure 4, with the body elevated.

Referring now particularly to the accompanying drawings, in which like numerals indicate like parts, the numeral 5 designates the chassis of an automobile truck or other vehicle mounted on a running gear comprising front and rear wheels 6 and 7, respectively, and their necessary axles. Inasmuch as the present invention is chiefly concerned with the stabilization of the load carried primarily by the rear wheels, only the rear axle 8 is shown.

The chassis 5 is supported on the running gear by springs including rear springs 9. These springs are mounted in the customary manner outside of the longitudinal rails of the chassis with their medial portions resting on the axle.

Attention is directed to the fact that the springs are relatively close together, which as noted hereinbefore is one of the factors responsible for the instability of the conventional truck.

Fixed on the chassis is a sub-frame 10 which carries the hoist mechanism indicated generally by the numeral 11 by which the load carrying body or platform 12 is raised and lowered. The specific construction of the body or platform 12 does not concern this invention. Likewise the specific design of the hoist mechanism is not a direct part of the invention. The hoist mechanism illustrated is that of Patent No. 2,219,525, issued to Glenway Maxon, Jr., October 29, 1940.

The characterizing feature of the hoist mechanism shown is the use of four bell crank levers 13 and vertical legs 14 projecting down from the body or platform and connected to the long arms of the bell crank levers so that rocking movement of the latter effects raising and lowering of the body or platform.

The bell crank levers 13 are arranged in front and rear pairs, the arms of each pair being connected by a transverse shaft. The transverse shaft connecting the front bell crank levers is journalled within a tubular cross head 15 and its end portions are connected by horizontal links 16, one at each side of the chassis, with the end portions of the transverse shaft 17 connecting the rear pair of bell crank levers.

The transverse connecting shafts are joined to the bell crank levers or arms 13 at one corner and have rollers 18 journalled thereon to ride in horizontal longitudinal trackways 18'. These trackways in conjunction with the links 16 constrain the transverse shafts connecting the bell crank levers to longitudinal motion in unison.

The remaining corner of each bell crank lever has a roller 19 mounted thereon to engage a slightly inclined almost vertical track 20 rigidly secured to cross members carried by the side rails 21 of the sub-frame. Thus, upon forward movement of the connected transverse shafts which join the bell crank levers, rocking movement is imparted to the bell crank levers to raise the body, while rearward movement of the assembly permits lowering of the body.

Such forward motion is imparted to this hoist mechanism assembly by a pair of hydraulic cylinders 22 having their rams connected to the cross head 15 and their cylinders anchored to a cross member 23 of the subframe. The functioning of these hydraulic cylinders is under control of a valve 24, the operating lever 25 of which is controllable through linkage 26 by a handle 27 accessible from the rear of the body or truck.

The linkage 26 also controls a pair of pawls 28 which cooperate with rack teeth 29 on the tie bars 16 to secure the body in an elevated position. Actuation of the linkage 26 to shift the valve to its position effecting descent of the body releases the pawls, but before the pawls can be released the load thereon must be lifted. To do this, the valve control linkage is first moved to open the valve and raise the body slightly and then when the pawls have been freed of load, the control linkage is quickly moved to its body lowering position.

The structure thus far described, is broadly the same as that forming the subject matter of the aforesaid Patent No. 2,219,525. It provides for the elevation of the load carrying body or platform in a horizontal position throughout its entire ascent and descent.

Inasmuch as the hoisting mechanism supports the body or platform at its four corners it affords an exceptionally rigid support for the body or platform, but is still subject to the inherent instability of an automobile truck or other vehicle mounted on springs.

It is, therefore, the specific purpose of this invention to provide a stabilizing mechanism by which the load is taken off the springs, at least off the rear springs, and transmitted directly to the rear axle. To this end a toggle indicated generally by the numeral 30 is located at each side of the chassis to provide a rigid load carrying connection between the chassis, or more specifically, the subframe fixed to the chassis, and the axle when in its straightened or active position. One arm 31 of each of these two toggles is pivoted to a cross shaft 32 joining the side rails 21 of the subframe and the extremity of its other arm 33 is formed to embrace the rear axle upon straightening the toggle.

In its collapsed inactive condition the toggle lies forwardly of the axle as shown in Figure 4, but in its active straightened out condition it extends substantially vertically above the axle, rigidly supporting the load independently of the springs. To guide the lower forked ends of the toggle into proper position, links 34 connect them with fixed pivots 35, and to straighten and collapse the toggles tie links 36 are provided.

One end of each tie link 36 is connected as at 37 to the pivotal connection between the toggle arms, and its other end is connected as at 38 to the free end of a lever 39. The two levers 39 are fixed to a cross shaft 40 extending between the side rails 21 of the subframe and journalled in bearings carried thereby. Forks 41 are also secured to this cross shaft. The open ends of the forks 41 are in position to embrace the rollers 18 of the bell crank levers which ride in the adjacent trackways 18'.

Thus, when rollers 18 commence their forward movement during the initial stages of the elevation of the body they cause the forks and consequently the levers 39 to rock in a counterclockwise direction (as seen in Figures 4 and 5) to assert a pull on the links 36 and straighten the toggles to their active load carrying positions shown in Figure 5. This takes place during a relatively short travel of the rollers 18 and to retain the linkage controlling the toggle in this position throughout the remainder of the ascent of the body and also until it is again brought back to its almost fully lowered position, cams 43 are formed on one arm of each fork and on which the rollers 18 ride in their travel along the trackways 18'.

From the foregoing description, taken in connection with the accompanying drawings, it will be readily apparent to those skilled in the art, that this invention provides an effective stabilizer mechanism readily applicable to any truck or vehicle having an elevatable body, as any moving part of the hoist mechanism may be employed to pull the toggles into their active positions and hold them there throughout the major portion of the ascent and descent of the body.

It will also be clear that while the invention is illustrated in association with a high lift truck designed primarily for the loading and unloading of cargo carrying airplanes, this invention is by no means limited to trucks for this purpose. For instance, it is ideally suited to uses such as fire fighting apparatus having extensible ladders mounted on the truck and where utmost stability must be achieved to enable raising the ladder to the extreme heights required. In such cases it is the initiation of the special function of the truck or vehicle or its operation during its initial stages which automatically activates the stabilizer; but in all cases non-yielding support is automatically substituted for the rear springs when added stability is needed.

What I claim as my invention is:

In a vehicle having an axle and a chassis supported thereon by springs: a stabilizer for substituting for the springs a non-yielding supporting connection between the chassis and the axle, comprising a pair of arms at each side of the chassis adjacent to the axle and pivotally connected to each other to form toggles, one arm of each toggle being pivoted to a part fixed with respect to the chassis and the other arm having a connection with the chassis constraining its end portion remote from the pivotal connection between the arms to travel in a defined path intersecting the axle from an inactive position entirely disconnected from the axle in the collapsed condition of the toggle to an active position with said end portion of the arm engaged with the axle to spread the axle and chassis apart in the straightened condition of the toggle so that straightening of the toggle spreads the axle and chassis apart regardless of the load on the vehicle springs to effect lifting of the chassis and relief of the springs; and means for straightening and collapsing the toggle.

GLENWAY MAXON, Jr.

REFERENCES CITED

The following references are of record in the file of this patent:

UNITED STATES PATENTS

| Number | Name | Date |
| --- | --- | --- |
| 440,827 | Hoffman | Nov. 18, 1890 |
| 1,581,358 | Mayer | Apr. 20, 1926 |
| 1,705,892 | Ballert | Mar. 19, 1929 |
| 1,914,308 | Swaltz et al. | June 13, 1933 |
| 2,219,525 | Maxon | Oct. 29, 1940 |
| 2,341,883 | Sloan | Feb. 15, 1944 |